United States Patent
Chu et al.

(10) Patent No.: US 7,243,209 B2
(45) Date of Patent: Jul. 10, 2007

(54) APPARATUS AND METHOD FOR SPEEDING UP ACCESS TIME OF A LARGE REGISTER FILE WITH WRAP CAPABILITY

(75) Inventors: Sam Gat-Shang Chu, Round Rock, TX (US); Maureen Anne Delaney, Richmond, VT (US); Saiful Islam, Austin, TX (US); Jafar Nahidi, Round Rock, TX (US); Dung Quoc Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 11/044,449

(22) Filed: Jan. 27, 2005

(65) Prior Publication Data

US 2006/0171208 A1  Aug. 3, 2006

(51) Int. Cl.
G06F 9/34 (2006.01)
G06F 13/00 (2006.01)

(52) U.S. Cl. .................. 711/211; 711/217; 711/218; 711/219; 365/230.02

(58) Field of Classification Search ............... 711/211, 711/217, 218, 219; 365/230.01, 230.02, 365/230.05
See application file for complete search history.

(56) References Cited

U.S. PATENT DOCUMENTS

| | | | | |
|---|---|---|---|---|
| 5,005,120 A | * | 4/1991 | Ruetz | 713/100 |
| 6,002,880 A | * | 12/1999 | Slavenburg | 712/24 |
| 6,662,261 B2 | * | 12/2003 | Duboc et al. | 711/5 |
| 6,721,295 B1 | * | 4/2004 | Brown | 370/335 |
| 2002/0122443 A1 | * | 9/2002 | Enam et al. | 370/537 |
| 2004/0039898 A1 | * | 2/2004 | Bosshart | 712/218 |
| 2004/0252728 A1 | * | 12/2004 | Rose | 370/539 |

* cited by examiner

Primary Examiner—Gary Portka
Assistant Examiner—Anton Rabovianski
(74) Attorney, Agent, or Firm—Stephen J. Walder, Jr.; Diana R. Gerhardt; Mark E. McBurney (57) ABSTRACT

An apparatus and method for speeding up access time of a large register file with wrap capability are provided. With the apparatus and method, the 2:1 multiplexers in conventional register file systems are eliminated from the circuit configuration and instead, additional primary multiplexers are provided for half of the addresses, e.g., the first four sub-arrays of the register file for which the wrap capability is needed. These additional primary multiplexers receive the read address and a shifted read word line signal. The other primary multiplexer receives the read address and an unshifted read word line signal. The outputs from the shifted and non-shifted primary multiplexers are provided to a set of secondary multiplexers which multiplex bits from the outputs of the shifted and non-shifted primary multiplexers to generate the read addresses to be used by the multiple read/write register file system.

20 Claims, 6 Drawing Sheets

APPARATUS AND METHOD FOR SPEEDING UP ACCESS TIME OF A LARGE REGISTER FILE WITH WRAP CAPABILITY

BACKGROUND OF THE INVENTION

1. Technical Field

The present invention relates generally to an improved data processing system and method. More specifically, the present invention provides an apparatus and method for speeding up access time of a large register file with wrap capability.

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

Figure 1:
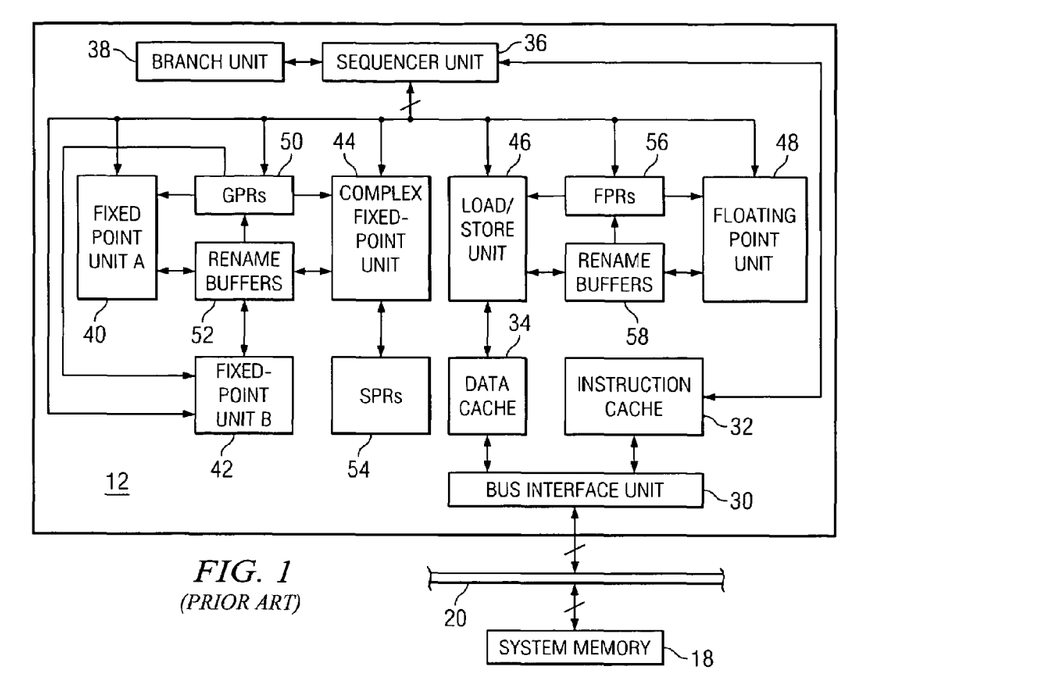
FIG. 1 is an exemplary block diagram of a processor in which an exemplary embodiment of the present invention may be implemented.

An illustrative embodiment of a conventional processing unit is shown in FIG. 1, which depicts the architecture for a PowerPC™ microprocessor 12 manufactured by International Business Machines Corporation. Microprocessor 12 operates according to reduced instruction set computing (RISC) and is a single integrated circuit superscalar microprocessor. The system bus 20 is connected to a bus interface unit (BIU) of microprocessor 12. Bus 20, as well as various other connections described, include more than one line or wire, e.g., the bus could be a 32-bit bus.

BIU 30 is connected to an instruction cache 32 and a data cache 34. The output of instruction cache 32 is connected to a sequencer unit 36. In response to the particular instructions received from instruction cache 32, sequencer unit 36 outputs instructions to other execution circuitry of microprocessor 12, including six execution units, namely, a branch unit 38, a fixed-point unit A (FXUA) 40, a fixed-point unit B (FXUB) 42, a complex fixed-point unit (CFXU) 44, a load/store unit (LSU) 46, and a floating-point unit (FPU) 48.

The inputs of FXUA 40, FXUB 42, CFXU 44 and LSU 46 also receive source operand information from general-purpose registers (GPRs) 50 and fixed-point rename buffers 52. The outputs of FXUA 40, FXUB 42, CFXU 44 and LSU 46 send destination operand information for storage at selected entries in fixed-point rename buffers 52. CFXU 44 further has an input and an output connected to special-purpose registers (SPRS) 54 for receiving and sending source operand information and destination operand information, respectively. An input of FPU 48 receives source operand information from floating-point registers (FPRs) 56 and floating-point rename buffers 58. The output of FPU 48 sends destination operand information to selected entries in rename buffers 58.

Microprocessor 12 may include other registers, such as configuration registers, memory management registers, exception handling registers, and miscellaneous registers, which are not shown. Microprocessor 12 carries out program instructions from a user application or the operating system, by routing the instructions and data to the appropriate execution units, buffers and registers, and by sending the resulting output to the system memory device (RAM), or to some output device such as a display console.

Figures 2, 2A:
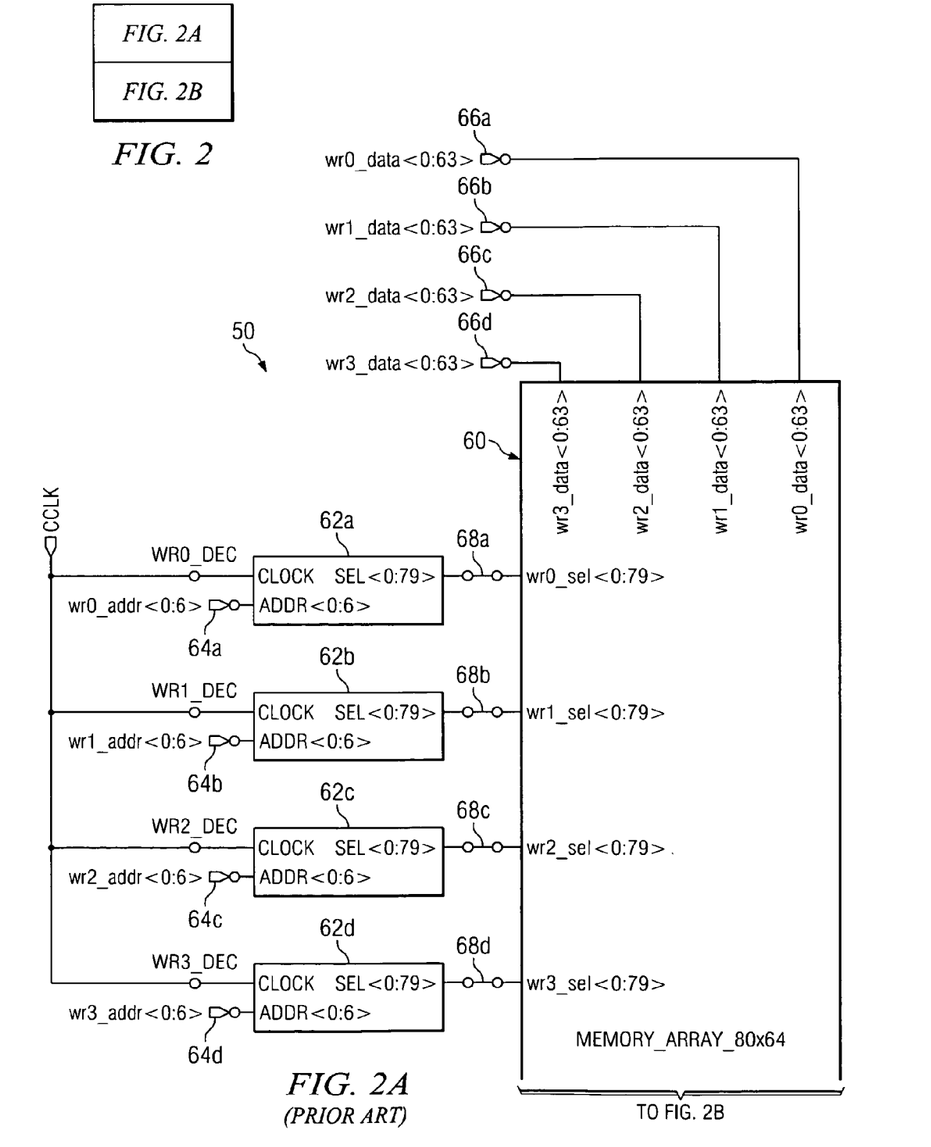
FIGS. 2A and 2B is a high-level schematic diagram of a typical general-purpose register.
Figure 2B:
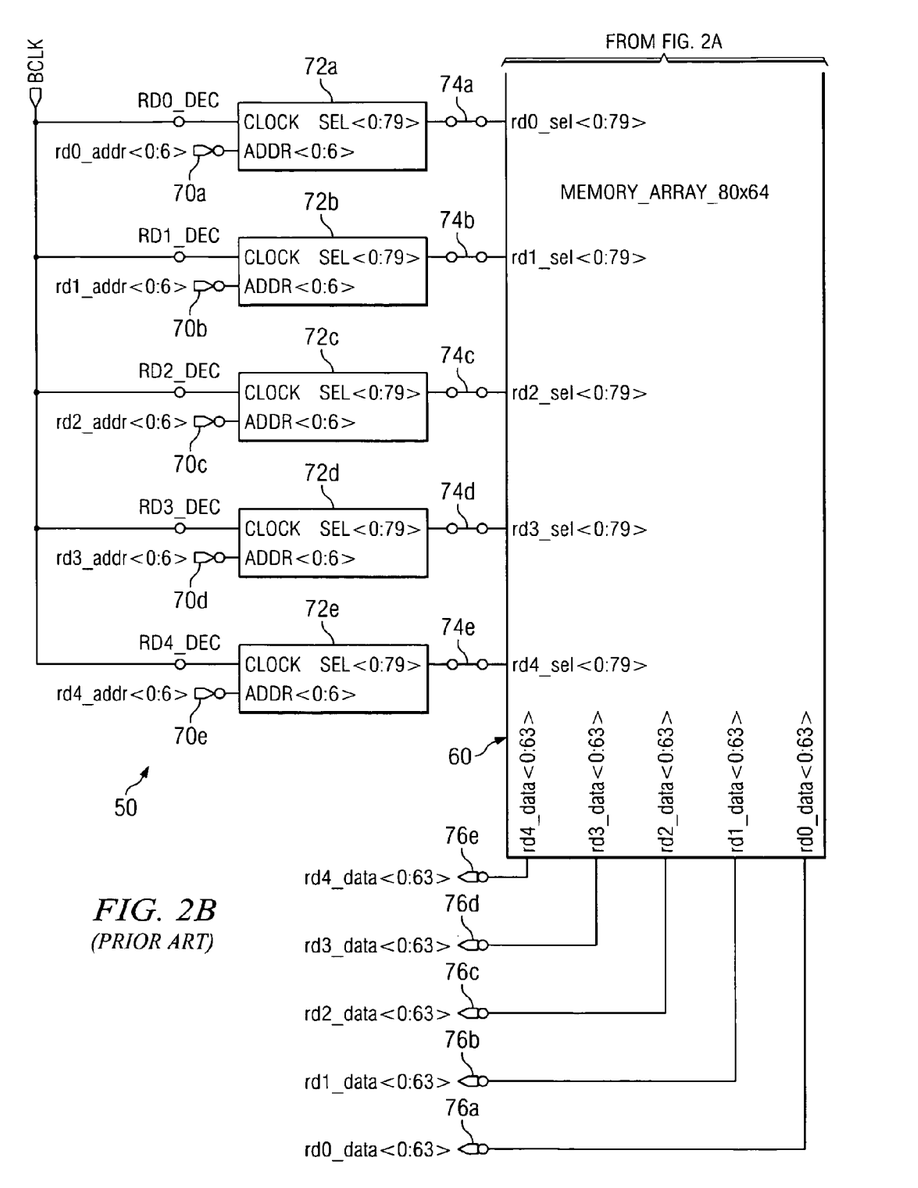

A high-level schematic diagram of a typical general-purpose register 50 is further shown in FIG. 2. GPR 50 has a block 60 labeled "MEMORY_ARRAY_80×64," representing a register file with 80 entries, each entry being a 64-bit wide word. Blocks 62*a* (WR0_DEC) through 62*d* (WR3_DEC) depict address decoders for each of the four write ports 64*a*–64*d*. For example, decoder 62*a* (WR0_DEC, or port 0) receives the 7-bit write address wr0_addr<0:6> (write port 64*a*). The 7-bit write address for each write port is decoded into 80 select signals (wr0_sel<0: 79> through wr3_sel<0:79>). Write data inputs 66*a*–66*d* (wr0_data<0:63>through wr3_data<0:63>) are 64-bit wide data words belonging to ports 0 through 3 respectively. The corresponding select line 68*a*–68*d* for each port (wr0_sel<0: 79> through wr3_sel<0:79>) selects the corresponding 64-bit entry inside array 60 where the data word is stored.

There are five read ports in this particular prior art GPR. Read ports 70*a*–70*e* (0 through 4) are accessed through read decoders 72*a*–72*e* (RD0_DEC through RD4_DEC), respectively. Select lines 74*a*–74*e* (rd0_sel<0:79> through rd4_sel<0:79>) for each decoder are generated as described for the write address decoders above. Read data for each port 76*a*–76*e* (rd0_data<0:63> through rd4_data<0:63>) follows the same format as the write data. The data to be read is driven by the content of the entry selected by the corresponding read select line.

Register files, such as the one described above, are a common type of storage circuitry used in modern day state-of-the-art microprocessors. For example, in the complex architecture of present-day microprocessors, an instruction buffer is used to store instructions coming out of the instruction cache, e.g. instruction cache 32, and may consist of a number of register file cells. For large register file arrays having multiple simultaneous reads and writes, it becomes extremely difficult to meet the cycle timing constraint to perform the decoding of the address lines and the reading of the register file array before having to store the result in the next stage latch. If the register file has wrap capability, i.e. once a last entry of a group or sub-array of the register file is accessed the next access goes back to the first entry of that group/sub-array, it becomes very complex and is almost impossible to work with all of the write addresses and read addresses for decoding. Instead, only the starting address is used for decoding purposes. However, this adds more time to the critical timing path due to the necessity to include additional circuitry to handle the wrap condition when only the starting address is used for decoding.

Therefore, it would be beneficial to have an improved apparatus and method for accessing a large register file having wrap capability. More specifically, it would be beneficial to have an apparatus and method for access a large register file having wrap capability which does not add additional time to the critical timing path.

SUMMARY OF THE INVENTION

The present invention provides an apparatus and method for speeding up access time of a large register file with wrap capability. With the present invention, the 2:1 multiplexers in conventional register file systems are eliminated from the circuit configuration and instead, additional primary multiplexers are provided for half of the addresses, e.g., the first four sub-arrays of the register file for which the wrap capability is needed. These additional primary multiplexers receive the read address from input latches and a shifted read word line from an array decoder. The other primary multiplexers receive the read address from the input latches and an unshifted read word line from the array decoder.

The outputs from the shifted and non-shifted primary multiplexers are provided to a set of secondary multiplexers which multiplex bits from the outputs of the shifted and non-shifted primary multiplexers to generate the read addresses to be used by the multiple read/write register file system. Thus, in one exemplary embodiment, a total of five read addresses are generated by the circuitry of the present invention.

In this way, the mechanism of the present invention may be used to eliminate the extra timing added by the 2:1 multiplexer in the timing critical path of the decoder of the register file system. The timing added by the additional multiplexer of the present invention is essentially masked out since the additional multiplexer operates in parallel with an existing multiplexer. Thus, the present invention achieves the same result as the known systems but eliminates the extra timing considerations of the 2:1 multiplexer at the cost of additional chip area for the additional 8:1 multiplexer. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism for accessing a large register file having wrap capability in which the accessing speed is made faster by eliminating the need for a 2:1 multiplexer in the critical timing paths of the decoder. As mentioned above, if the register file has wrap capability it becomes very complex and is almost impossible to work with all of the write addresses and read addresses for decoding. Instead, only the starting address is used for decoding purposes. However, this adds more time to the critical timing paths due to the necessity to include additional circuitry. For example, additional 2:1 multiplexers may be added to the decoder paths which are used to select either the entry or the next entry in the group/sub-array based on whether a wrap of the register file group or sub-array has occurred.

To illustrate this further, consider a 64 entry register file array partitioned into 8 groups or sub-arrays. Five consecutive entries must be read from this register file array using only one read start bit address. Thus, decoding the three most significant bits of that address generates an 8 bit read word line (rwl) that can be used in all the sub-arrays. If the read starts from the first sub-array, the straight decode of the read address to generate a common rwl would work, i.e. there is no wrap condition. A problem arises, however, when the read starts from the fifth sub array, i.e. the wrap case. The wrap case causes the decode of the read address to generate an incorrect read word line for the fifth read.

Figure 3:
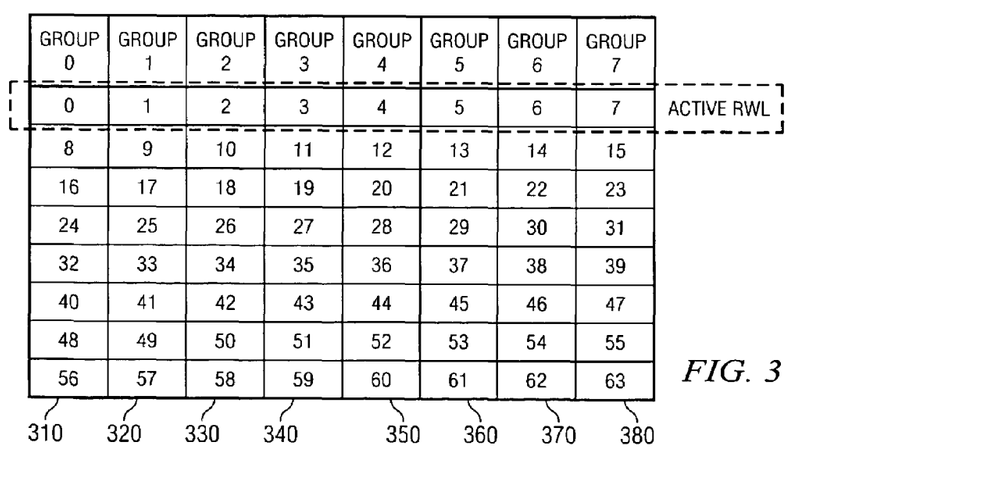
FIG. 3 is an exemplary diagram illustrating a register file array partitioned into eight sub-arrays, each having eight entries.

FIG. 3 is an exemplary diagram illustrating a register file array partitioned into eight sub-arrays 310–380, each having eight entries. If entries 4, 5, 6, 7, and 8 are to be read, the straight decoder will have only the top sub-array's rwl active. Thus, because the sub-arrays wrap, the entries that are read out would be 4, 5, 6, 7 and 0. As a result, an incorrect read word line for the fifth read exists.

Figure 4:
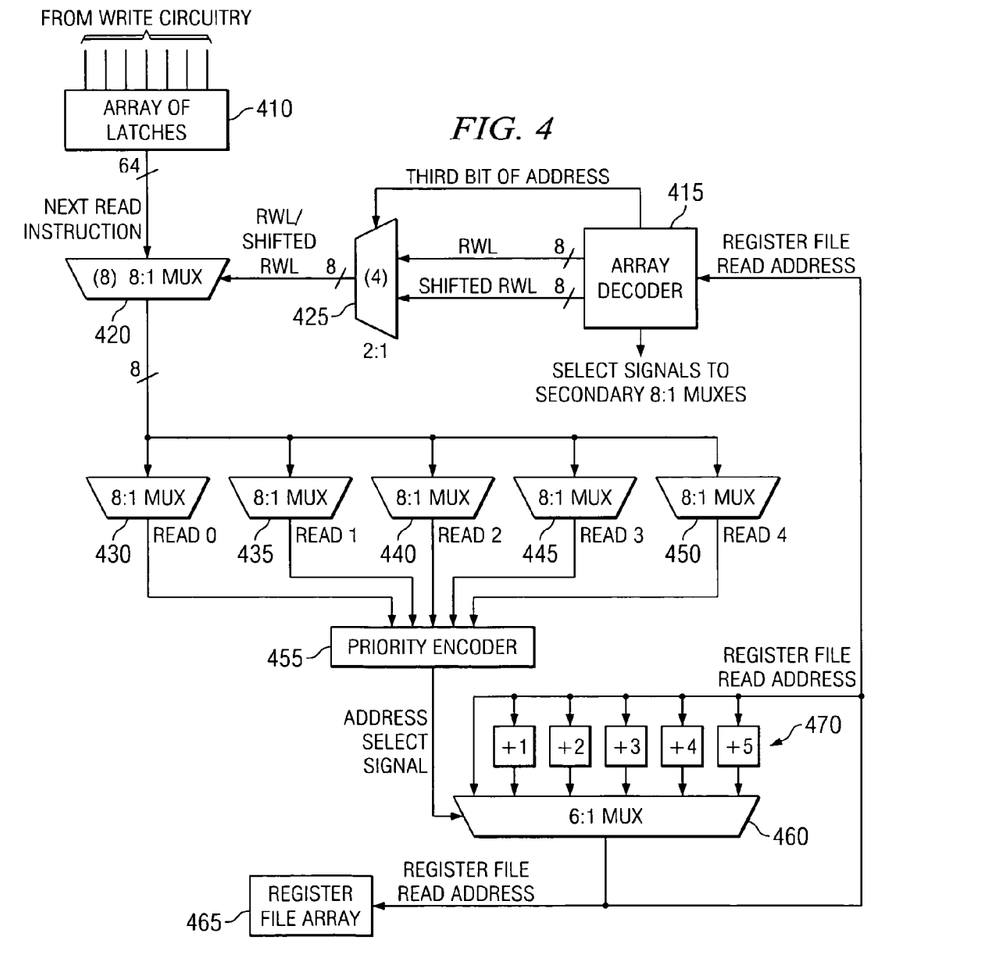
FIG. 4 is an exemplary block diagram of a register file array access mechanism in which a 2:1 multiplexer is used to compensate for a wrap capability of the register file array.

In order to address this problem, a 2:1 multiplexer may be used to choose the correct rwl for the first four sub-arrays. FIG. 4 is an exemplary block diagram of a register file array access mechanism in which a 2:1 multiplexer is used to compensate for a wrap capability of the register file array. As shown in FIG. 4, the access mechanism includes an array of latches 410, an array decoder 415, eight primary 8:1 multiplexers 420 (only one of the 8:1 multiplexers is shown for clarity), four 2:1 multiplexers 425 (only one of the 2:1 multiplexers is show for clarity), secondary 8:1 multiplexers 430–450, priority encoder 455, 6:1 multiplexer 460, register file array 465 and incrementers 470.

The array of latches 410 receives input from write circuitry, e.g., instruction cache 32, which indicates the address of the next instruction to be read from register file array 465. The array of latches 410 are shown as a separate element in FIG. 4. However, the array of latches 410 may actually be part of register file array 465. For performance reasons, however, in a preferred embodiment of the present invention, the array of latches 410 are a separate element from register file array 465.

The read instruction address is provided to the eight 8:1 multiplexers 420 which also receives a read word line or shifted read word line from the four 2:1 multiplexers 425. Whether a straight read word line or a shifted read word line is output to the eight 8:1 multiplexers 420 is dependent upon the value of the third bit of the register file read address received in the array decoder 415.

The array decoder 415 receives a register file read address from the 6:1 multiplexer 460 which outputs the register file read address for accessing appropriate cells or entries in the register file array 465, as discussed hereafter. This register file read address is decoded by the array decoder 415 which generates a read word line from the register file read address. The read word line (rwl) and a shifted rwl are output to the four 2:1 multiplexers 425. In addition, the array decoder 415 outputs a signal indicative of the value of the third bit of the register file read address. This third bit address signal is used as the select signal for the four 2:1 multiplexers 425 to determine whether the straight rwl or the shifted rwl is to be output by the 2:1 multiplexers 425 to the 8:1 multiplexers 420.

For purposes of the depicted example, the value of the third bit of the register file read address is used because the value of this bit will be 0 for cases in which a wrap of the register file will not occur and will be 1 for cases in which a wrap of the register file will occur. This is because the depicted system performs five reads per instruction cycle and thus, only reads starting at entries in groups 4, 5, 6 and 7 (see FIG. 3) will result in a wrap of the register file.

Only four 2:1 multiplexers 425 are utilized for the first four subgroups, i.e. the first four 8:1 multiplexers 420, because only reads that start from the last four subgroups can wrap and thus, only reading of entries from the first four subgroups may need to be shifted, i.e. from entry E to entry E+1. As a result, with reference again to FIG. 3, rather than reading entry 0 from sub-array 310, entry 8 is read from sub-array 310, i.e. E+1, when a wrap of the register file array 410 has occurred. Thus, the last four subgroups, i.e. the last four 8:1 multiplexers 420, will always receive the straight rwl from the array decoder 415 and the first four subgroups, i.e. the first four 8:1 multiplexers 420, may receive either the straight rwl or a shifted rwl depending upon whether a wrap condition has occurred or not.

The shifting of the rwl may be performed in a number of different ways. An actual shifter may be provided to shift the signal, an incrementer may be used to increment the value of the signal which may then be decoded to provide the proper input to the 8:1 multiplexers 420, or the shifting may be performed in the wire itself, i.e. rather than the 0 line selected, the 1 line may be selected. In a preferred embodiment, the shifting of the rwl is performed in the wire itself.

Each of the eight 8:1 multiplexers 420 provide a bit signal of a read address to secondary 8:1 multiplexers 430–450. For some of these 8:1 multiplexers 420, the bit signal is shifted by +1 from the bit signal that would be generated from the straight rwl. Each of the secondary 8:1 multiplexers 430–450 multiplexes the eight inputs from the eight 8:1 multiplexers 420 to generate a next read address.

The select for the secondary 8:1 multiplexers 430–450 is provided by the array decoder 415. The select signals are generated based on the register file read address input to the array decoder 415 and are used to control which of the inputs to secondary 8:1 multiplexers 430–450 are output to the priority encoder 455. For example, in the case of the register file read address indicating a first entry in the register file array, the select signals sent from the array decoder 415 would be such that the first, second, third, fourth and fifth entries, i.e. entries 0, 1, 2, 3 and 4, in the register file array are output by the secondary 8:1 multiplexers 430–450.

In the wrap case, the first four primary 8:1 multiplexers 420 will have a shifted read word line while second four primary 8:1 multiplexers 420 will have the standard read word line. As a result, the first four primary 8:1 multiplexers 420 will always be associated with the next row in the register file array in the case of a wrap. For example, if the register file read address indicates that the read address is at entry 5 of the register file array, then entries 5, 6, 7, 8 and 9 are to be read. As a result, the first four primary multiplexers 420 will output values corresponding to entries 8, 9, 10 and 11 while the second four primary multiplexers 420 will output values corresponding to entries 5, 6, 7 and 0. The select signals sent to the secondary 8:1 multiplexers 430–450 are used to select entries 5, 6, 7, 8 and 9 in such a case.

The output from the secondary 8:1 multiplexers 430–450 is provided to priority encoder 455 which generates an address select signal based on the values of the outputs from the secondary 8:1 multiplexers 430–450. For example, if the output from the secondary 8:1 multiplexers 430–450 were 10000, then and address select signal would be output by the priority encoder 455 indicating that the read address, i.e. read 0, is to be used to access the register file array 465. If the output were 01000 or 01100, for example, then the priority encoder 455 would generate an output signal indicating that the read address +1, or read 1, is to be used to access the register file array 465. This is because, in the depicted example, read 0 is given priority over read 1, which has priority over read 2, which has priority over read 3, which has priority over read 4.

The address select signal is provided to 6:1 multiplexer 460 which selects either the straight read address, the read address +1, read address +2, read address +3, read address +4 or read address +5 as the output register file read address. These various register file read addresses may be generated using, for example, incrementers 470. The 6:1 multiplexer 460 outputs the register file read address which is then used to access cells or entries in the register file array 465. The output of the cells/entries in the register file array 465 may be provided to one or more of the various logic units shown in FIG. 1, e.g., fixed point unit, floating point unit, load/store unit, etc., for processing.

In addition, the register file read address is provided to the 6:1 multiplexer 460 and the incrementers 470 for generation of the next 5 addresses that may be used to access the register file array 465. The register file read address is also provided to the array decoder 415 which uses this register file read address to determine whether a wrap of the register file array 465 will occur.

As discussed above, the addition of the 2:1 multiplexer 425 in the critical timing path causes additional delay in the path. As a result, the access time for the register file array is increased. Therefore, it would be beneficial to eliminate this additional delay if possible. The present invention provides a mechanism for eliminating this additional delay at the cost of additional chip area.

With the present invention, the 2:1 multiplexer is eliminated from the circuit configuration and instead, additional primary 8:1 multiplexers are provided for half of the addresses, e.g., the first four sub-arrays for which the wrap capability is needed. The additional primary 8:1 multiplexers receive a shifted rwl signal from the decoder which essentially shifts the read address. The other primary 8:1 multiplexers receive the read address and a non-shifted rwl signal. In one exemplary embodiment, the read address is stored in an array of latches prior to it being provided to the primary 8:1 multiplexers.

In another exemplary embodiment, a portion of the register file array, e.g., cells in the first four sub-arrays, may be provided with additional read ports, e.g., 2 read ports instead of 1 read port per cell or entry, so that the read address is provided directly from the register file array to the primary 8:1 multiplexers. In such an embodiment, the two read ports act as a 2:1 multiplexer in that reads are performed from port 0 as a default and from port 1 in the case of a wrap condition. This will slightly grow the size of the register file cells and the array, which will affect the timing of the circuit, however this additional overhead will be less than the savings due to removal of the 2:1 multiplexer.

The outputs from the shifted and non-shifted primary 8:1 multiplexers are provided to a set of secondary 8:1 multiplexers which multiplex bits from the outputs of the shifted and non-shifted primary 8:1 multiplexers to generate the read addresses to be used by the multiple read/write register file system. Thus, in one exemplary embodiment, a total of five read addresses are generated by the circuitry of the exemplary embodiment of the present invention.

Figure 5:
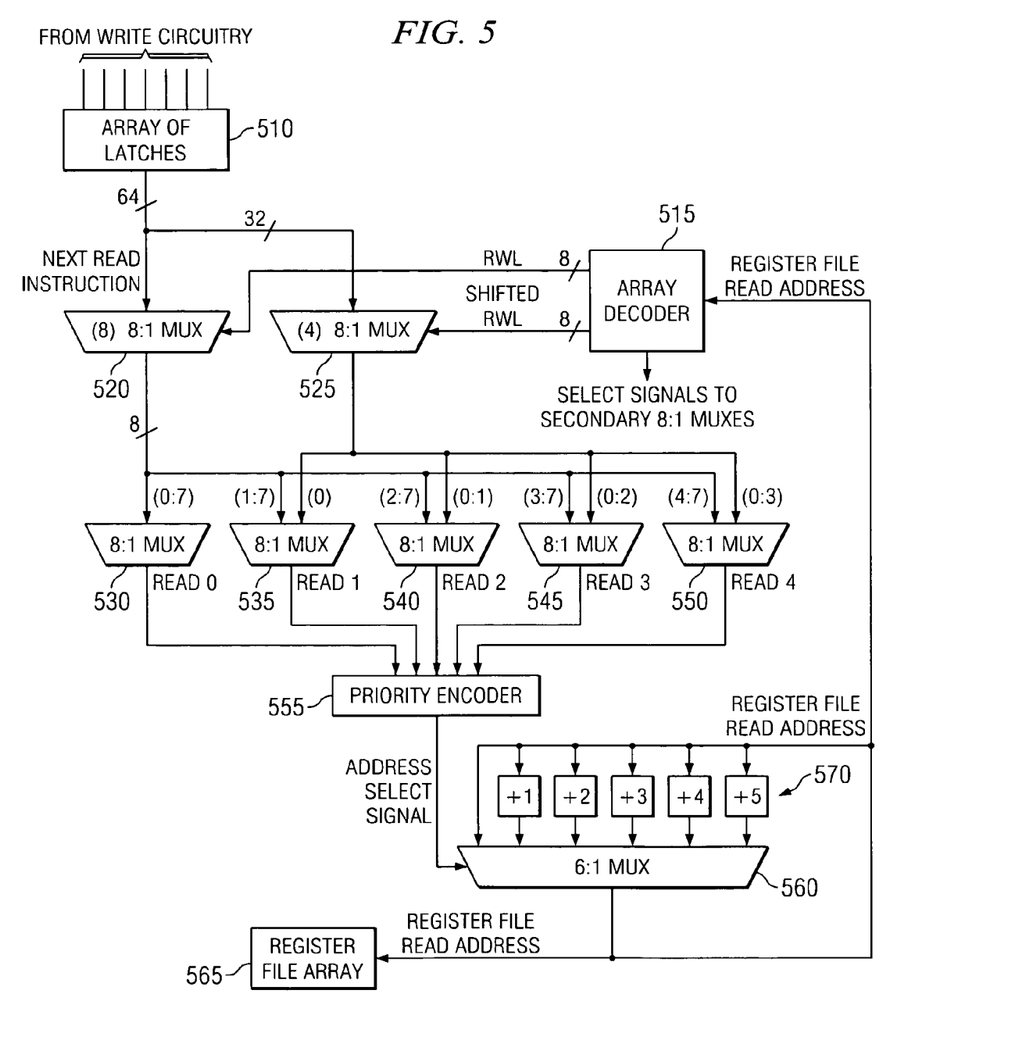
FIG. 5 is an exemplary block diagram of a file register array access mechanism according to an exemplary embodiment of the present invention.

FIG. 5 is an exemplary block diagram of a file register array access mechanism according to an exemplary embodiment of the present invention. As shown in FIG. 5, the depicted circuit includes an array of latches 510, an array decoder 515, eight non-wrap primary 8:1 multiplexers 520, four wrap primary 8:1 multiplexers 525, a plurality of secondary 8:1 multiplexers 530–550, a priority encoder 555, a 6:1 multiplexer 560, a register file array 565, and a plurality of incrementers 570. The primary difference between the circuit illustrated in FIG. 5 and that shown in FIG. 4 is the replacement of the 2:1 multiplexers 425 with the wrap primary 8:1 multiplexers 525 and the input to secondary 8:1 multiplexers 530–550 including bits from both the non-wrap primary 8:1 multiplexers 520 and the wrap primary 8:1 multiplexers 525. The other elements shown in FIG. 5 operate in substantially the same manner as shown in FIG. 4 and thus, a detailed explanation of these elements will not be provided in connection with FIG. 5.

As shown in FIG. 5, a read address is provided by the array of latches 510 to the non-wrap primary 8:1 multiplexers 520 and to the four wrap primary 8:1 multiplexers 525. The array decoder 515 provides a read word line (rwl), generated based on the register file read address that is input from 6:1 multiplexer 560, to non-wrap primary 8:1 multiplexers 520 and a shifted rwl to the wrap primary 8:1 multiplexers 525. It should be noted that a separate select signal based on the third bit of the register file read address does not need to be generated by the array decoder 515 since the wrap primary 8:1 multiplexers 525 always receive the shifted rwl as a select signal.

The output of the non-wrap primary 8:1 multiplexers 520 is essentially the unshifted read address. The output of the wrap primary 8:1 multiplexers 525 is essentially a shifted read address. The output from the non-wrap primary 8:1 multiplexers 520 and the wrap 8:1 multiplexers 525 are both provided to the secondary multiplexers 530–550. As shown in FIG. 5, the non-wrap primary 8:1 multiplexers 520 provide bits 0 to 7 of the read address to multiplexer 530, bits 1 to 7 of the read address to multiplexer 535, bits 2 to 7 to multiplexer 540, bits 3 to 7 to multiplexer 545, and bits 4 to 7 to multiplexer 550. Wrap primary 8:1 multiplexers 525 provide bit 0 of the shifted read address to multiplexer 535, bits 0 and 1 of the shifted read address to multiplexer 540, bits 0 to 2 of the shifted read address to multiplexer 545, and bits 0 to 3 of the shifted read address to multiplexer 550.

From these inputs, the four multiplexers 530–550 generate five data outputs identifying locations in the register file array, which are then used to generate the next read address that is used to access the register file system. The output from the secondary 8:1 multiplexers 530–550 is provided to the priority encoder 555 in a similar manner as discussed above with regard to FIG. 4. The priority encoder 555 generates an address select signal which is used with the 6:1 multiplexer 560 to determine whether the read address, the read address +1, read address +2, etc., is selected as the register file read address for accessing the cells or entries in the register file array 565.

Thus, the additional wrap primary 8:1 multiplexers 525 provide a mechanism for generating the next four read addresses for the multiple read/write register file while still preserving the wrap capability and removing the 2:1 multiplexers in the critical timing cycle. The result is a 64:1 multiplexer in which the timing associated with the additional wrap primary 8:1 multiplexers 525 is essentially masked out by the non-wrap primary 8:1 multiplexers 520 since both operate on the output from the array of latches 510 in parallel. Therefore, the configuration shown in FIG. 5 eliminates the extra timing added by the 2:1 multiplexers in the configuration shown in FIG. 4, does not add any additional timing considerations to the circuit, and only costs some additional area on the chip to implement.

It should be appreciated that the above description of the exemplary embodiment of the present invention has been provided in terms of particular types of multiplexers and numbers of read addresses, however the present invention is not limited to such. Rather, in systems where more or fewer read addresses are used, different configurations of multiplexers may be used in the manner described above to generate the requisite number of read addresses. In addition, in systems having different word lengths or address lengths, the types of multiplexers may be different from 8:1 multiplexers depending upon the number of inputs to the multiplexers. Other modifications to the configuration show and described above in connection with FIG. 5 may be used without departing from the spirit and scope of the present invention.

Figure 6:
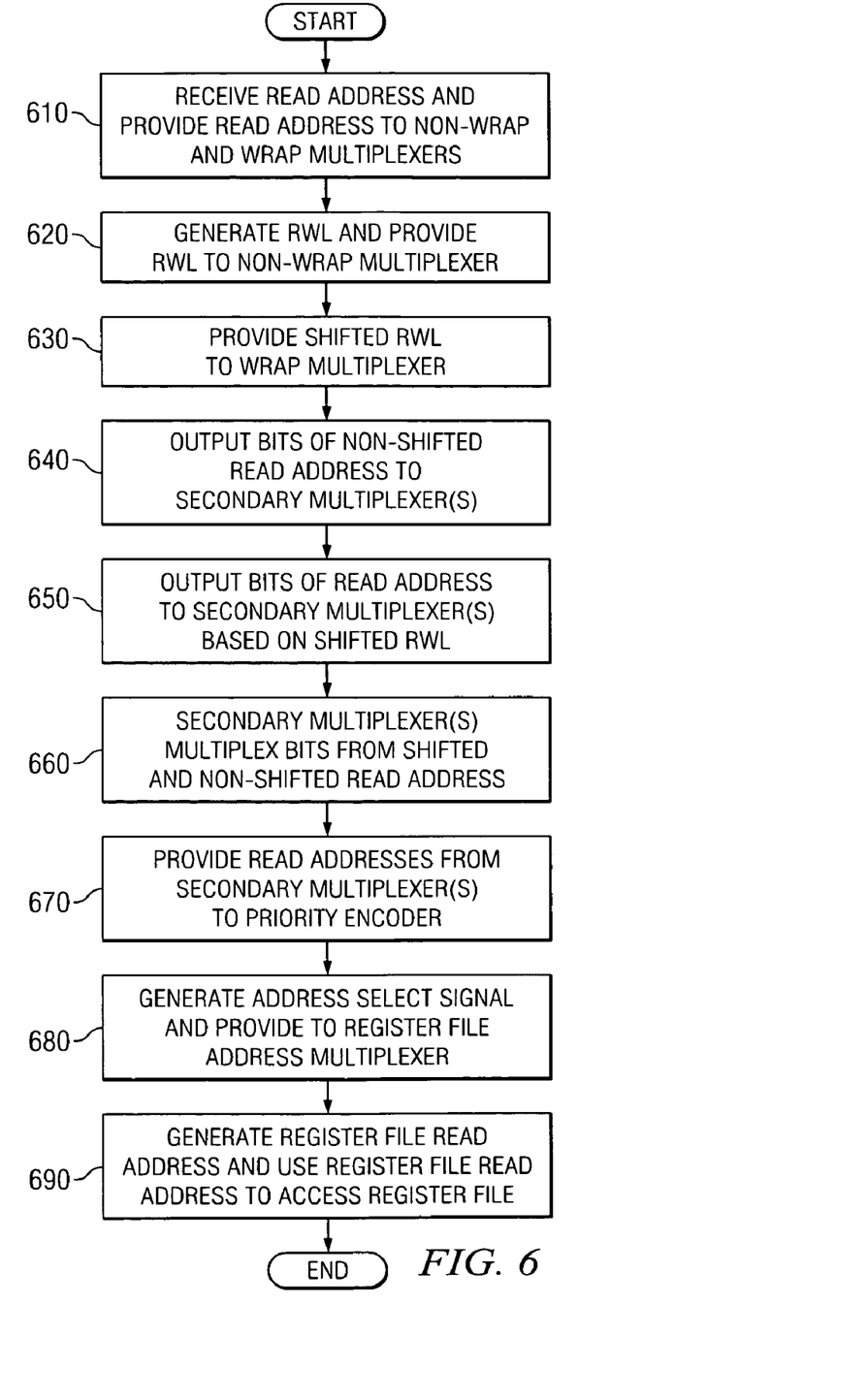
FIG. 6 is a flowchart outlining an exemplary operation of one exemplary embodiment of the present invention.

FIG. 6 is a flowchart outlining an exemplary operation of one exemplary embodiment of the present invention. It should be appreciated that while FIG. 6 illustrates a series of steps, the present invention is not limited to any particular order of these steps. Rather, many of the steps illustrated in FIG. 6 may be performed in a different order or in parallel with other steps of FIG. 6 at approximately the same time. Thus, the serial nature of the illustration in FIG. 6 is only meant for clarity and is not intended to state or imply any particular order of operations.

As shown in FIG. 6, the operation starts by obtaining a read address (step 610). The read address is provided to non-wrap multiplexers and a wrap multiplexers. A read word line (rwl) is generated and provided to the non-wrap multiplexers (step 620) which output bits of the non-shifted read address to one or more secondary multiplexers (step 640). The particular bits sent to each of the one or more multiplexers are determined based on the rwl.

A shifted rwl signal is generated and sent to the wrap multiplexers (step 630). The wrap multiplexers send bits of the read address to the one or more secondary multiplexers (step 650) based on the shifted rwl signal. As a result, bits of a shifted read address are sent to the one or more secondary multiplexers from the wrap multiplexer. The particular bits sent to the one or more secondary multiplexers are determined based on the shifted rwl signal.

The one or more secondary multiplexers multiplex the bits from the non-wrap multiplexers and the wrap multiplexers to generate one or more read addresses (step 660) which are provided to the priority encoder (step 670). The priority encoder generates an address select signal and provides the address select signal to the register file address multiplexer (step 680). A register file read address is then generated based on the address select signal and the read address and incremented read address signals input to the register file address multiplexer. This register file read address is then used to access the register file array (step 690). The data read from the register file array may then be used by logic units in the processor. The operation then terminates.

Thus, the present invention provides a mechanism which may be used to eliminate the extra timing added by the 2:1 multiplexers in the timing critical path of the decoder of the register file system. The timing added by the additional multiplexers of the present invention is essentially masked out since the additional multiplexers operate in parallel with existing multiplexers. Thus, the present invention achieves the same result, but eliminates the extra timing considerations of the 2:1 multiplexers at the cost of additional chip area for the additional multiplexers.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus for generating an address for accessing a register file array, comprising:
   a first primary multiplexer coupled to the register file array;
   a second primary multiplexer coupled to the register file array; and
   one or more secondary multiplexers coupled to the first primary multiplexer and second primary multiplexer, wherein:
   the first primary multiplexer outputs bits from a non-shifted original address to the one or more secondary multiplexers,
   the second primary multiplexer outputs bits from a shifted original address to the one or more secondary multiplexers, and
   the secondary multiplexers multiplex bits from the first primary multiplexer and the second primary multiplexer to generate at least one address for accessing the register file array.

2. The apparatus of claim 1, further comprising:
   a priority encoder coupled to the one or more secondary multiplexers, wherein the priority encoder generates an address select signal based on output from the secondary multiplexers, and wherein the address select signal is used to select one of a plurality of possible register file access addresses for accessing the register file array.

3. The apparatus of claim 2, wherein the address select signal is provided to a register file address multiplexer which outputs one of the plurality of possible register file access addresses based on the address select signal.

4. The apparatus of claim 1, further comprising:
   an array decoder coupled to the first primary multiplexer and the second primary multiplexer, wherein the first primary multiplexer receives a read word line from the array decoder and the second primary multiplexer receives a shifted read word line from the array decoder.

5. The apparatus of claim 1, further comprising:
   an array of latches coupled to the first primary multiplexer and the second primary multiplexer, wherein the original address is stored in the array of latches prior to being provided to the first and second primary multiplexers.

6. The apparatus of claim 1, wherein the first primary multiplexer is part of a set of eight first primary multiplexers.

7. The apparatus of claim 1, wherein the second primary multiplexer is part of a set of four second primary multiplexers.

8. The apparatus of claim 1, wherein the first primary multiplexer and the second primary multiplexer are 8:1 multiplexers.

9. The apparatus of claim 1, wherein the one or more secondary multiplexers include five 8:1 multiplexers.

10. The apparatus of claim 3, wherein the register file address multiplexer is a 6:1 multiplexer, and wherein the plurality of possible register file access addresses includes a first register file read address and second register file read addresses that are the first register file read address incremented by predetermined amounts.

11. A method, in a data processing system, for generating an address for accessing a register file array, comprising:
    providing an original address to a first primary multiplexer;
    providing the original address to a second primary multiplexer;
    generating, in the first primary multiplexer, a first output having bits of the original address to one or more secondary multiplexers;
    generating, in the second primary multiplexer, a second output having bits of a shifted original address to the one or more secondary multiplexers; and
    generating, in the one or more secondary multiplexers, at least one address for accessing the register file array by multiplexing bits from the first output and the second output.

12. The method of claim 11, further comprising:
    generating an address select signal based on output from the secondary multiplexers, wherein the address select signal is used to select one of a plurality of possible register file access addresses for accessing the register file array.

13. The method of claim 12, wherein the address select signal is provided to a register file address multiplexer which outputs one of the plurality of possible register file access addresses based on the address select signal.

14. The method of claim 11, further comprising:
    generating, in an array decoder, a read word line based on a register file read address previously used to access the register file array;
    providing the read word line to the first primary multiplexer; and
    providing a shifted read word line to the second primary multiplexer.

15. The method of claim 11, further comprising:
    storing the original address in an array of latches coupled to the first primary multiplexer and the second primary multiplexer prior to the original address being provided to the first and second primary multiplexers.

16. The method of claim 11, wherein the first primary multiplexer is part of a set of eight first primary multiplexers, and wherein the set of eight first primary multiplexers receive the original address and generate bits of the original address to be sent to the one or more secondary multiplexers.

17. The method of claim 11, wherein the second primary multiplexer is part of a set of four second primary multiplexers, and wherein the set of four second primary multiplexers receive the original address and generate bits of a shifted original address to be sent to the one or more secondary multiplexers.

18. The method of claim 11, wherein the first primary multiplexer and the second primary multiplexer are 8:1 multiplexers.

19. The method of claim 11, wherein the one or more secondary multiplexers include five 8:1 multiplexers.

20. The method of claim 13, wherein the register file address multiplexer is a 6:1 multiplexer, and wherein the plurality of possible register file access addresses includes a first register file read address and second register file read addresses that are the first register file read address incremented by predetermined amounts.

* * * * *